(12) United States Patent
Oh et al.

(10) Patent No.: US 11,573,058 B2
(45) Date of Patent: Feb. 7, 2023

(54) EASILY ASSEMBLED HEAT EXCHANGER

(71) Applicant: Hanon Systems, Daejeon (KR)

(72) Inventors: Kwang Hun Oh, Daejeon (KR); Ara Jo, Daejeon (KR)

(73) Assignee: Hanon Systems, Daejeon (KR)

( * ) Notice: Subject to any disclaimer, the term of this patent is extended or adjusted under 35 U.S.C. 154(b) by 52 days.

(21) Appl. No.: 16/767,171

(22) PCT Filed: Dec. 11, 2018

(86) PCT No.: PCT/KR2018/015679
§ 371 (c)(1),
(2) Date: May 27, 2020

(87) PCT Pub. No.: WO2019/124853
PCT Pub. Date: Jun. 27, 2019

(65) Prior Publication Data
US 2020/0386494 A1     Dec. 10, 2020

(30) Foreign Application Priority Data

Dec. 18, 2017    (KR) ........................ 10-2017-0174051

(51) Int. Cl.
*F28F 9/02*       (2006.01)
*F28F 1/10*       (2006.01)

(52) U.S. Cl.
CPC ................ *F28F 9/026* (2013.01); *F28F 1/10* (2013.01); *F28F 2275/14* (2013.01); *F28F 2280/06* (2013.01)

(58) Field of Classification Search
CPC ........... F28F 2275/14; F28F 9/026; F28F 1/01
See application file for complete search history.

(56) References Cited

U.S. PATENT DOCUMENTS 3,605,874 A * 9/1971 Brunell ................ F28D 19/044
                                                                   165/10
8,739,857 B2 * 6/2014 Garret ................ F02B 29/0462
                                                                 165/157

(Continued)

FOREIGN PATENT DOCUMENTS

FR          3056716 A1 * 3/2018 ........... F28D 9/0037
JP          H051895 A * 10/1991 .............. F28F 9/001

(Continued)

OTHER PUBLICATIONS

Translation of Japanese Patent Document JPH051895A entitled Translation—JPH051895A (Year: 1993).*

(Continued)

*Primary Examiner* — Paul Alvare
(74) *Attorney, Agent, or Firm* — Norton Rose Fulbright US LLP; James R. Crawford

(57) ABSTRACT

A heat exchanger with a core part; an upper reinforcing plate which is disposed on the upper side of the core part in the height direction and in which a first fixing/matching section is formed; a pair of lateral reinforcing plates disposed on both sides of the core part in the longitudinal direction, the upper side of at least one of the two lateral reinforcing plates being coupled to the first fixing/matching section of the upper reinforcing plate, and a second fixing/matching section being formed on the lower side of each of the lateral reinforcing plates; and a lower reinforcing plate disposed on the lower side of the core part in the height direction, and both sides of which are coupled to the second fixing/matching sections of the pair of lateral reinforcing plates, wherein each of components can be correctly positioned, and thus productivity and assemblability are improved.

3 Claims, 13 Drawing Sheets

(56) References Cited

U.S. PATENT DOCUMENTS

| | | | |
|---|---|---|---|
| 9,909,821 B2* | 3/2018 | Bardeleben | F28F 21/06 |
| 10,641,559 B2* | 5/2020 | Yoo | F28F 3/048 |
| 2011/0168366 A1* | 7/2011 | Garret | F28F 9/001 |
| | | | 165/148 |
| 2011/0247318 A1* | 10/2011 | Kuroyanagi | F28F 9/001 |
| | | | 60/278 |
| 2013/0284409 A1* | 10/2013 | Odillard | F28F 13/12 |
| | | | 29/890.03 |
| 2014/0246185 A1* | 9/2014 | Onetti | F28D 9/0043 |
| | | | 165/166 |
| 2017/0131044 A1* | 5/2017 | Martins | F28F 9/0229 |
| 2020/0386494 A1* | 12/2020 | Oh | F28F 9/026 |

FOREIGN PATENT DOCUMENTS

| | | |
|---|---|---|
| JP | 4715188 B2 | 7/2011 |
| JP | 2013145097 A | 7/2013 |
| JP | 2014206371 A | 10/2014 |
| KR | 950014830 A | 6/1995 |
| KR | 20040091804 A | 11/2004 |
| KR | 20080003473 A | 1/2008 |
| KR | 101116844 B1 | 3/2012 |
| KR | 20140088122 A | 7/2014 |
| KR | 20140098404 A | 8/2014 |

OTHER PUBLICATIONS

International Search Report issued in PCT/KR2018/015679 dated Mar. 18, 2019.

* cited by examiner

EASILY ASSEMBLED HEAT EXCHANGER

CROSS-REFERENCE TO RELATED APPLICATIONS

This application is a national phase under 35 U.S.C. § 371 of International Application No. PCT/KR2018/015679 filed Dec. 11, 2018, which claims the benefit of priority from Korean Patent Application No. 10-2017-0174051, filed Dec. 18, 2017, each of which is hereby incorporated by reference in its entirety.

TECHNICAL FIELD

The present invention relates to a heat exchanger, and more particularly, to a water-cooling type intercooler capable of cooling air compressed by a supercharger at a high temperature and at a high pressure in a water-cooling manner to increase an output of an engine among heat exchangers.

BACKGROUND ART

Among heat exchangers, an intercooler is a device cooling air compressed by a supercharger at a high temperature and at a high pressure to increase an output of an engine.

The air compressed rapidly by the supercharger has a very high temperature, which causes an expansion in volume and a decrease in oxygen density, resulting in a deterioration in filling efficiency inside a cylinder. The intercooler cools the high-temperature air compressed by the supercharger to increase intake efficiency of the engine cylinder and improve combustion efficiency, thereby increasing fuel efficiency.

The intercooler playing this role can be classified into a water-cooling type intercooler or an air-cooling type intercooler depending on a cooling method. Between the two types of intercoolers, the water-cooling type intercooler 10 is similar in principle to the air-cooling type intercooler, but different in that the compressed air is cooled using a coolant of a vehicle or water, instead of external air, when cooling the intercooler through which hot air passes.

The water-cooling type intercooler 10 illustrated in FIG. 1 includes: a first header tank 20 and a second header tank 30 spaced apart from each other by a predetermined distance and formed in parallel with each other; a first inlet pipe 40 and a first outlet pipe 50 formed at the first header tank 20 and at the second header tank 30, respectively, the first inlet pipe 40 allowing air to be introduced therethrough and the first outlet pipe 50 allowing the air to be discharged therethrough; a plurality of tubes 60 having both ends fixed to the first header tank 20 and the second header tank 30 to form an air passage; fins 70 interposed between the tubes 60; a cover member 80 in which an assembly of the tubes 60 and the fins 70 is accommodated and of which one side on which one ends of the tubes 60 are located and the other side are open; and a second inlet pipe 41 and a second outlet pipe 51 formed at one side of the cover member 80, the second inlet pipe 41 allowing a coolant to be introduced therethrough and the second outlet pipe 51 allowing the coolant to be discharged therethrough.

Alternately, the water-cooling type intercooler 10 may be configured in the reverse manner as follows: the coolant passes through the inside of the tubes; a heat exchanger core, which is an assembly where the header tanks, the tubes, and the fins are assembled, is disposed inside; a case is formed to surround the core; and air passes through the inside of the case to be cooled by the core.

However, in this water-cooling type intercooler, reinforcers for reinforcement of strength may be coupled onto outer sides of the core part including the header tanks, the tubes, and the fins to reinforce the strength of the core part. When the reinforcers are assembled with the core part, it is not easy to place each component at a correct position, and when each component is joined by brazing or the like in a state where the component is not assembled at the correct position, there is concern about a portion that is not joined, which causes a leakage of the air or the or coolant.

RELATED ART DOCUMENT

Patent Document

KR 10-1116844 B1 (Feb. 8, 2012)

DISCLOSURE

Technical Problem

An object of the present invention is to provide a heat exchanger in which since a core part and reinforcing plates coupled to the core part in order to reinforce the strength of the core part may be disposed at correct positions at the time of being assembled to each other, the core part and the reinforcing plates may be easily assembled to each other, and interference between edges of the core part and the reinforcing plates does not occur, such that brazeability is improved at the time of joining the core part and the reinforcing plates to each other by brazing after the core part and the reinforcing plates are assembled to each other.

Technical Solution

In one general aspect, a heat exchanger includes: a core part 100 including an inlet header tank 110 and an outlet header tank 120 formed in a height direction with a space for a coolant to be stored or flowing therein, a plurality of tubes 130 having both ends connected to the header tanks 110 and 120 to form a coolant flow path, and fins 140 interposed between the tubes 130; an upper reinforcing plate 500 disposed on the core part 100 in the height direction and having a first fixing/matching section 520 therein; a pair of lateral reinforcing plates 200 disposed at both sides of the core part 100 in a length direction and having second fixing/matching sections 220 formed in respective lower sides thereof, an upper side of at least one of the pair of lateral reinforcing plates 200 being coupled to the first fixing/matching section 520 of the upper reinforcing plate 500; and a lower reinforcing plate 400 disposed beneath the core part 100 in the height direction and having both sides coupled to the second fixing/matching sections 220 of the pair of lateral reinforcing plates 200.

The core part 100, the upper reinforcing plate 500, the pair of lateral reinforcing plates 200, and the lower reinforcing plate 400 may be each independently formed, and respective surfaces thereof contacting each other may be joined.

The first fixing/matching section 520 of the upper reinforcing plate 500 may be a through hole penetrating vertically through the upper reinforcing plate 500, and a first fixing tab 230 may extend upwardly from an upper end of the lateral reinforcing plate 200, such that the first fixing tab 230 is inserted and coupled into the first fixing/matching section 520.

Each of the first fixing/matching section 520 and the first fixing tab 230 may be formed in a plural number.

The second fixing/matching sections 220 of the pair of lateral reinforcing plates 200 may be cut grooves formed to be concave upwardly from respective lower ends of the pair of lateral reinforcing plates 200, and the lower reinforcing plate 400 may have second fixing tabs 430 extending outwardly from both ends thereof in the length direction respectively, such that the second fixing tabs 430 are inserted and coupled into the second fixing/matching sections 220.

In another general aspect, a heat exchanger includes: a core part 100 including an inlet header tank 110 and an outlet header tank 120 formed in a height direction with a space for a coolant to be stored or flowing therein, a plurality of tubes 130 having both ends connected to the header tanks 110 and 120 to form a coolant flow path, and fins 140 interposed between the tubes 130; an upper reinforcing plate 500 disposed on the core part 100 in the height direction and having a first fixing/matching section 520 therein; and an integral reinforcer 800 including a pair of lateral reinforcing plates 200 disposed at both sides of the core part 100 in a length direction, an upper side of at least one of the pair of lateral reinforcing plates 200 being coupled to the first fixing/matching section 520 of the upper reinforcing plate 500, and a lower reinforcing plate 400 disposed beneath the core part 100 in the height direction and integrally formed with the pair of lateral reinforcing plates 200, with recesses 410 formed to be concave along a width direction at inner edges where the respective lateral reinforcing plates 200 and the lower reinforcing plate 400 meet.

The pair of lateral reinforcing plates 200 and the lower reinforcing plate 400 of the integral reinforcer 800 may be joined to the core part 100 on respective surfaces thereof contacting the core part 100.

The first fixing/matching section 520 of the upper reinforcing plate 500 may be a through hole penetrating vertically through the upper reinforcing plate 500, and a first fixing tab 230 may extend upwardly from an upper end of the lateral reinforcing plate 200, such that the first fixing tab 230 is inserted and coupled into the first fixing/matching section 520.

Each of the first fixing/matching section 520 and the first fixing tab 230 may be formed in a plural number.

The integral reinforcer 800 may be formed by bending a single plate, with U-shaped curved sections 420 formed to be convex downwardly at folded portions on both ends of the lower reinforcing plate 400 in the length direction such that concave inner sides of the curved sections 420 are formed as the recesses 410, and the lateral reinforcing plates 200 may extend upwardly from ends of the curved sections 420.

The integral reinforcer 800 may be formed by bending a single plate, while the recesses 410 are formed to be concave at folded portions in the form of V-shaped notches at inner edges where the lateral reinforcing plates 200 and the lower reinforcing plate 400 meet.

The lateral reinforcing plates 200 and the lower reinforcing plate 400 of the integral reinforcer 800 may have slot-type holes 440 connected to the recesses 410 in the form of notches and penetrating through both sides thereof.

Advantageous Effects

The heat exchanger of the present invention is advantageous in that the core part and the reinforcing plates coupled to reinforce the strength of the core part can be correctly positioned, thereby facilitating assembling and improving productivity.

In addition, the heat exchanger of the present invention is advantageous in that edges of the core part can closely adhere to the inner surfaces of the reinforcing plates, thereby improving brazeability when the core part and the reinforcing plates are joined by brazing.

BEST MODE

Hereinafter, a heat exchanger of the present invention having the above-described configuration will be described in detail with reference to the accompanying drawings.

First Exemplary Embodiment

Figure 1:
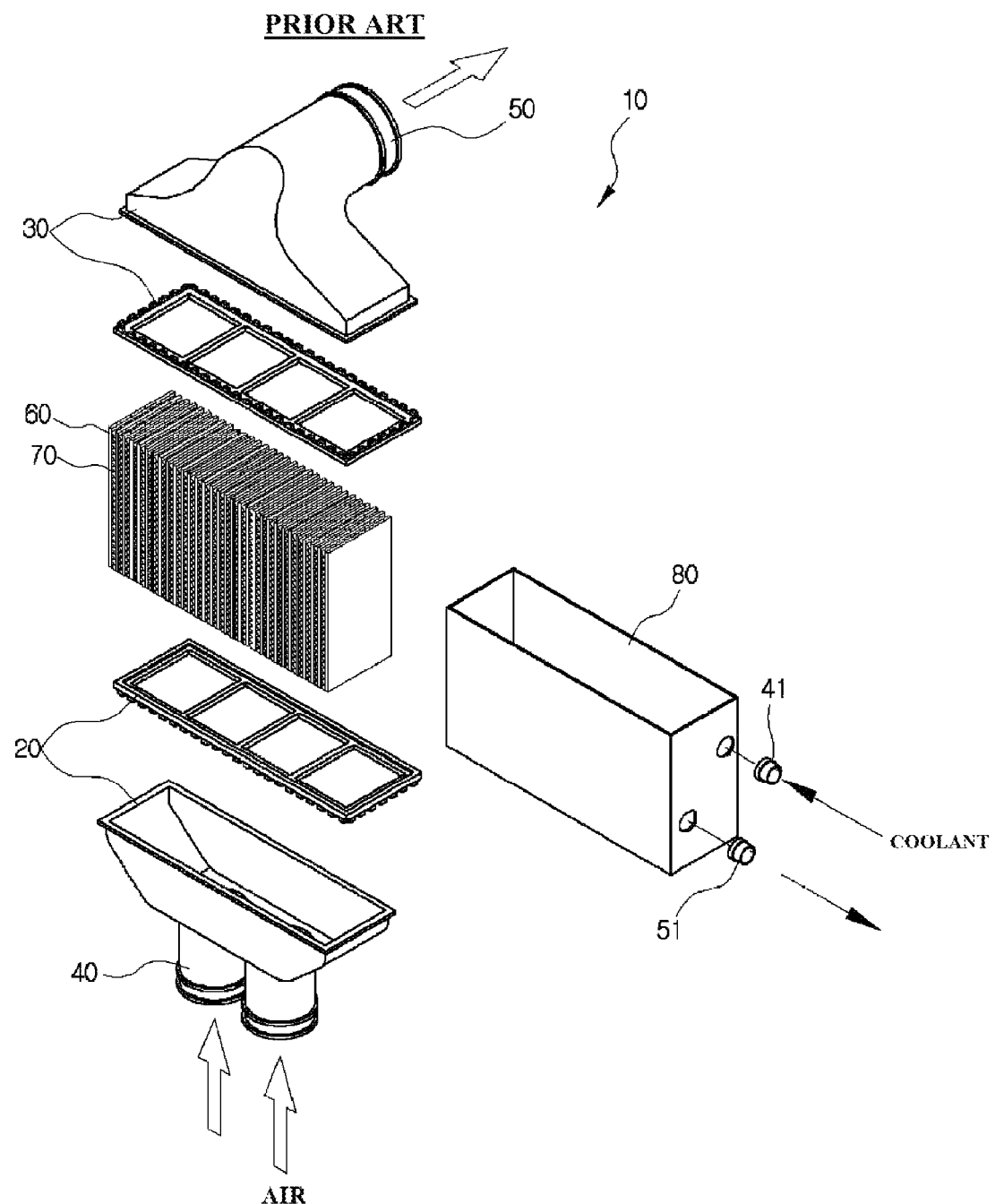
FIG. 1 is an exploded perspective view illustrating a conventional water-cooling type intercooler.
Figure 2:
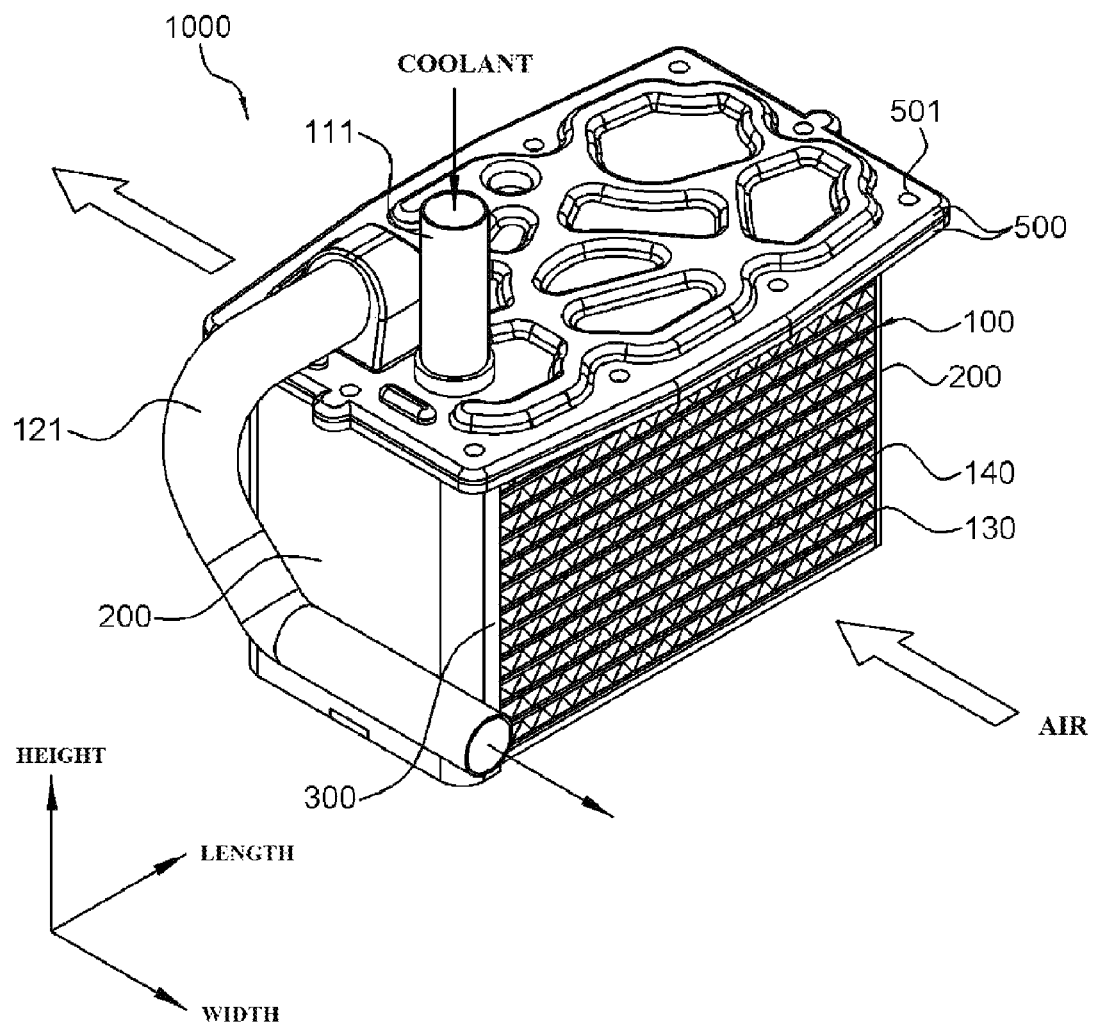
FIG. 2 is an assembled perspective view illustrating a heat exchanger according to a first exemplary embodiment of the present invention.

FIG. 2 is an assembled perspective view illustrating a heat exchanger according to a first exemplary embodiment of the present invention.

Figure 3:
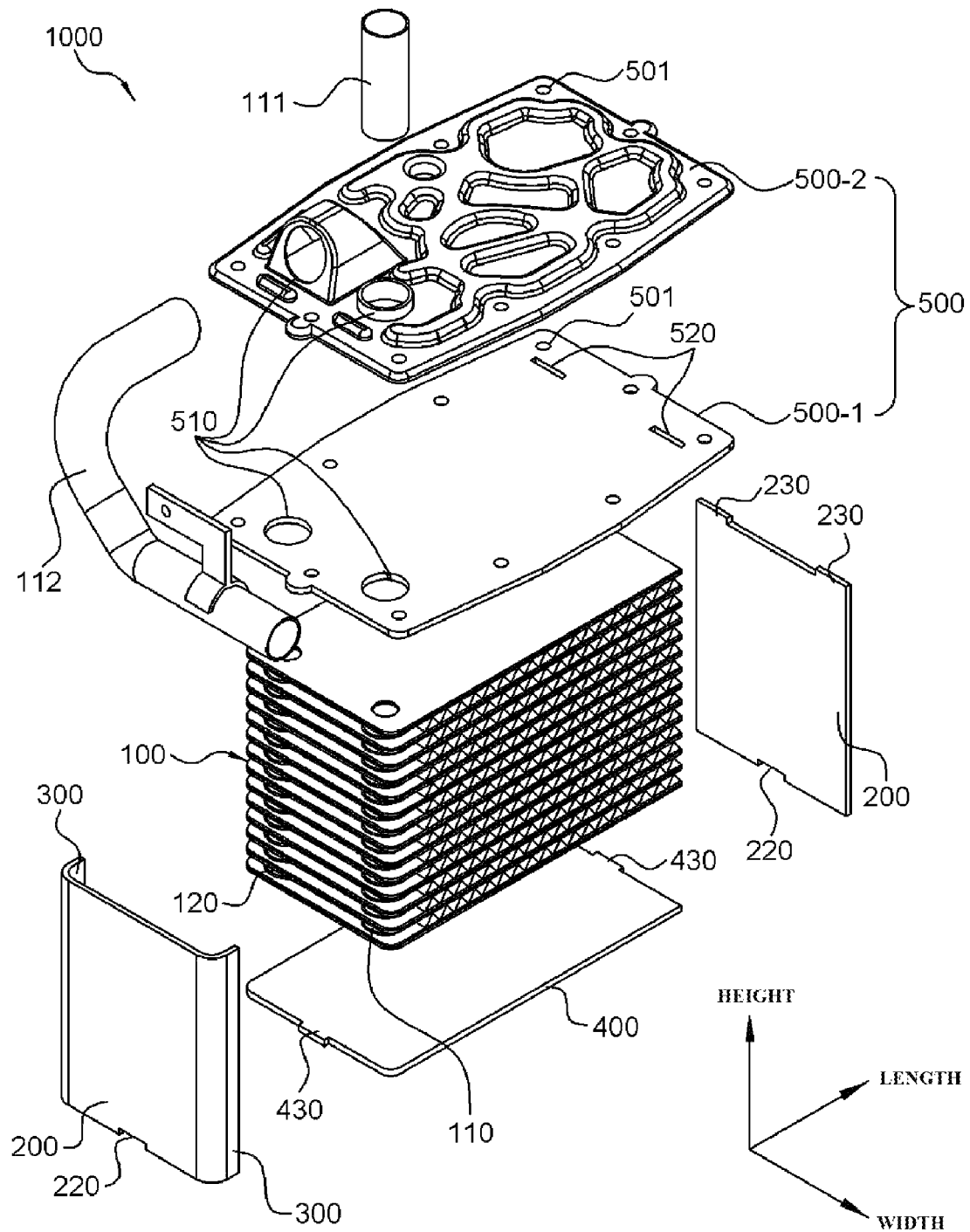
FIG. 3 is an exploded perspective view illustrating a heat exchanger according to a first exemplary embodiment of the present invention.

FIG. 3 is exploded perspective view illustrating a heat exchanger according to a first exemplary embodiment of the present invention.

Figure 4:
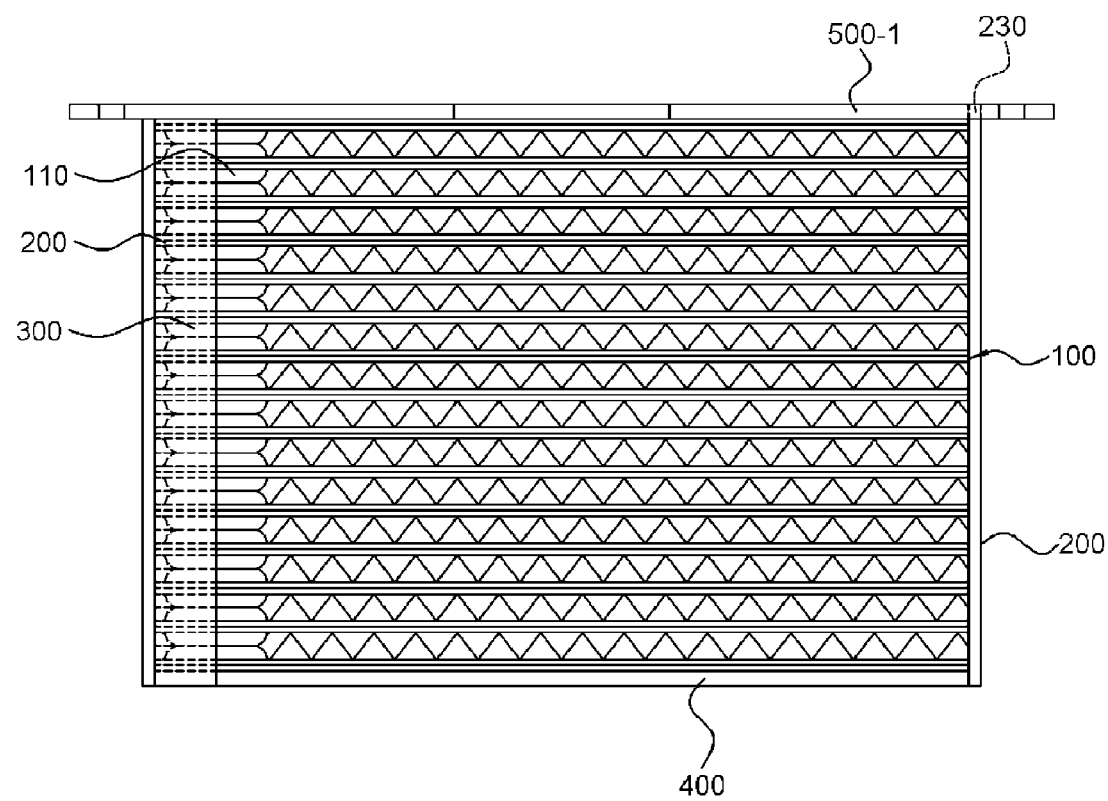
FIG. 4 is a front view illustrating a heat exchanger according to a first exemplary embodiment of the present invention.

FIG. 4 is a front view illustrating a heat exchanger according to a first exemplary embodiment of the present invention.

As illustrated, a heat exchanger 1000 according to the first exemplary embodiment of the present invention may include: a core part 100 including an inlet header tank 110 and an outlet header tank 120 formed in a height direction with a space for a coolant to be stored or flowing therein, a plurality of tubes 130 having both ends connected to the header tanks 110 and 120 to form a coolant flow path, and fins 140 interposed between the tubes 130; an upper reinforcing plate 500 disposed on the core part 100 in the height direction and having a first fixing/matching section 520 therein; a pair of lateral reinforcing plates 200 disposed at both sides of the core part 100 in a length direction and having second fixing/matching sections 220 formed in respective lower sides thereof, an upper side of at least one of the pair of lateral reinforcing plates 200 being coupled to the first fixing/matching section 520 of the upper reinforcing plate 500; and a lower reinforcing plate 400 disposed beneath the core part 100 in the height direction and having both sides coupled to the second fixing/matching sections 220 of the pair of lateral reinforcing plates 200.

First, the heat exchanger 1000 according to the first exemplary embodiment of the present invention may largely include the core part 100, the upper reinforcing plate 500, the pair of lateral reinforcing plates 200, and the lower reinforcing plate 400.

The core part 100 may include the inlet header tank 110, the outlet header tank 120, the tubes 130, and the fins 140. The inlet header tank 110 is a component forming a space for storing a coolant introduced from the outside therein and allowing the coolant to flow along the inside thereof, and may be formed in the height direction. The outlet header tank 120 is a component forming a space for collecting and storing the coolant that is heat-exchanged with air passing through the core part 100 and allowing the coolant to flow along the inside thereof to be discharged to the outside, and may be formed in the height direction. The tube 130 is a component of which one end is connected to the inlet header tank 110 and the other end is connected to the outlet header tank 120 to form a flow path for the coolant to flow and to be heat-exchanged with air, and may be formed in a plural number in parallel to each other in the length direction while being arranged to be spaced apart from each other in the height direction. In this case, the header tanks 110 and 120 and the tubes 130 may be formed in various types, for example, in the form of a plate-shaped heat exchanger in which a plurality of plates are stacked in an integral type, and in the form of an extruded tube-type heat exchanger in which the plurality of tubes 130 in a pipe type are connected and fixed to the header tanks 110 and 120 in a pipe type. The fins 140 may be interposed between the tubes 130 to improve heat exchange efficiency, and for example, the fins 140 may be formed in a corrugated shape and coupled to the tubes 130. Here, the header tanks 110 and 120 may be disposed at either side or both sides of the core part 100 in the length direction, but it is illustrated in the drawings that the header tanks 110 and 120 are formed on one side in the length direction, and the following description will be based on an exemplary embodiment in which header tanks 110 and 120 are formed on one side of the core part 100 in the length direction. In addition, as illustrated, the header tanks 110 and 120 and the tubes 130 will also be based on the plate-shaped heat exchanger in which the plurality of plates are stacked in the integral type. In this case, a coolant introduced into the inlet header tank 110 may flow along the tubes 130 in a U-turn manner to be discharged to the outside through the outlet header tank 120. Thus, the coolant introduced from the outside may be distributed to the tubes 130 while flowing in the height direction along the inlet header tank 110, flow in the length direction along the tubes 130 and make U-turns to be collected in the outlet header tank 120, and then flow in the height direction to be discharged to the outside. In this case, air may flow from a front side to a rear side in a width direction of the core part 100, and the air may pass between the tubes 130 for heat exchange so that the air is cooled.

The upper reinforcing plate 500 may be formed in a plate shape and disposed in contact with an upper surface of the core part 100, and the upper reinforcing plate 500 may have a coupling hole 510 penetrating through upper and lower surfaces thereof so that the coupling hole 510 is connected to the inlet header tank 110 or the outlet header tank 120. The first fixing/matching section 520 may be formed in the upper reinforcing plate 500.

The pair of lateral reinforcing plates 200 may be formed in a plate shape and arranged in contact with the both sides of the core part 100, respectively, in the length direction, and an upper side of at least one lateral reinforcing plate 200 of the pair of lateral reinforcing plates 200 may be coupled and fixed to the first fixing/matching section 520 formed in the upper reinforcing plate 500. In addition, the second fixing/matching sections 220 may be formed in respective lower sides of the pair of lateral reinforcing plates 200.

The lower reinforcing plate 400 may be formed in a plate shape and disposed in contact with a lower surface of the core part 100, and the both sides of the lower reinforcing plate 400 in the length direction may be coupled and fixed to the second fixing/matching sections 220 formed in the pair of lateral reinforcing plates 200 respectively.

Here, as an example, the core part 100, the upper reinforcing plate 500, the pair of lateral reinforcing plates 200, and the lower reinforcing plate 400 may form an assembly in which four surfaces of the core part are all surrounded by the reinforcing plates by placing the lower reinforcing plate 400, coupling the pair of lateral reinforcing plates 200 to the lower reinforcing plate 400, then inserting and assembling the core part 100 into an internal space surrounded by the lower reinforcing plate 400 and the lateral reinforcing plates 200, and thereafter assembling and coupling the upper reinforcing plate 500 from above.

Accordingly, when assembling the core part and the reinforcing plates to form an assembly, the components can be assembled in a state where the components to be assembled are disposed at correct positions with respect to each other, thereby facilitating the assembling and improving productivity.

In addition, the core part 100, the upper reinforcing plate 500, the pair of lateral reinforcing plates 200, and the lower reinforcing plate 400 may be each independently formed, and respective surfaces thereof contacting each other may be joined.

That is, as described above, after assembling the core part and the reinforcing plates to form an assembly, the independent components of the assembly may be firmly coupled to each other by joining the surfaces thereof contacting each other through brazing or the like. Accordingly, the reinforcing plates are firmly coupled and joined to surround four surfaces of the core part, so that the core part may be prevented from being deformed even when high-temperature and high-pressure air passes between the tubes, thereby improving durability of the core part.

In addition, the first fixing/matching section 520 of the upper reinforcing plate 500 is a through hole penetrating vertically through the upper reinforcing plate 500, and a first fixing tab 230 extends upwardly from an upper end of the lateral reinforcing plate 200, such that the first fixing tab 230 may be inserted and coupled into the first fixing/matching section 520.

That is, as illustrated, the upper reinforcing plate 500 may have the first fixing/matching section 520 formed as a through hole penetrating through the upper and lower surfaces of the upper reinforcing plate 500, and the lateral reinforcing plate 200 may have the first fixing tab 230 formed to protrude upwardly from the upper end thereof, such that the first fixing tab 230 is inserted and coupled into the first fixing/matching section 520, thereby firmly fixing the lateral reinforcing plate 200 to the upper reinforcing plate 500. Here, an inner edge where the upper reinforcing plate 500 and the lateral reinforcing plate 200 meet may be formed in an angular shape rather than a round shape, thereby preventing interference with an edge of the core part 100 when the core part 100 is assembled.

In this case, each of the first fixing/matching section 520 and the first fixing tab 230 may be formed in a plural number.

That is, as illustrated, the first fixing/matching section 520 formed in the upper reinforcing plate 500 may be formed in a plural number to be spaced apart from each other in the width direction, and the first fixing tab 230 formed on the lateral reinforcing plate 200 may also be formed in a plural number at positions corresponding to the first fixing/matching sections 520, thereby more firmly coupling the lateral reinforcing plate 200 to the upper reinforcing plate 500 and preventing a posture of the lateral reinforcing plate 200 from being warped.

In addition, the second fixing/matching sections 220 of the pair of lateral reinforcing plates 200 are cut grooves formed to be concave upwardly from respective lower ends of the pair of lateral reinforcing plates 200, and the lower reinforcing plate 400 has second fixing tabs 430 extending outwardly from both ends thereof in the length direction respectively, such that the second fixing tabs 430 may be inserted and coupled into the second fixing/matching sections 220.

That is, the pair of lateral reinforcing plates 200 have the second fixing/matching sections 220 formed as the cut grooves in a concave form upwardly from the lower ends of the lateral reinforcing plates 200, and the lower reinforcing plate 400 is formed to have the second fixing tabs 430 protruding outwardly from the both ends thereof in the length direction, such that the second fixing tabs 430 may be inserted and coupled into the second fixing/matching sections 220, thereby firmly fixing the pair of lateral reinforcing plates 200 and the lower reinforcing plate 400 to each other. Here, an inner edge where the lateral reinforcing plate 200 and the lower reinforcing plate 400 meet may be formed in an angular shape rather than a round shape, thereby preventing interference with an edge of the core part 100 when the core part 100 is assembled. Accordingly, the core part can be assembled with the reinforcing plates in a state where edges of the core part closely adhere to inner surfaces of the reinforcing plates, thereby improving brazeability when the core part and the reinforcing plates are joined by brazing.

In addition, the heat exchanger 1000 according to the first exemplary embodiment of the present invention may further include a blocking plate 300 extending from the lateral reinforcing plate 200 in the length direction, and the blocking plate 300 may be formed to partially cover a lateral surface of the core part 100 in the length direction. The blocking plate 300 may also be joined to the core part 100 by brazing.

Second Exemplary Embodiment

Figure 5:
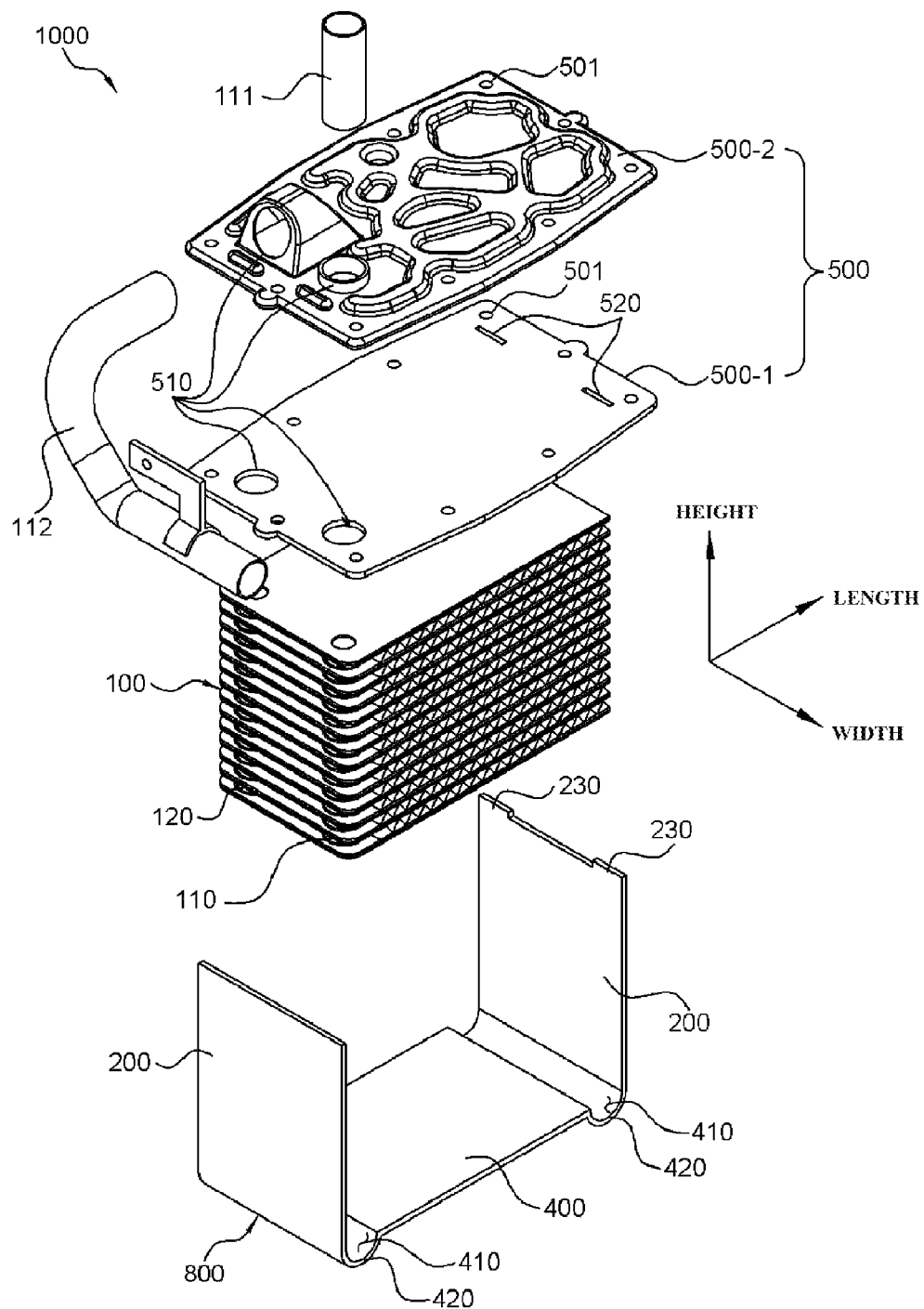
FIG. 5 is an exploded perspective view illustrating a heat exchanger according to a second exemplary embodiment of the present invention.

FIG. 5 is an exploded perspective view illustrating a heat exchanger according to a second exemplary embodiment of the present invention.

Figure 6:
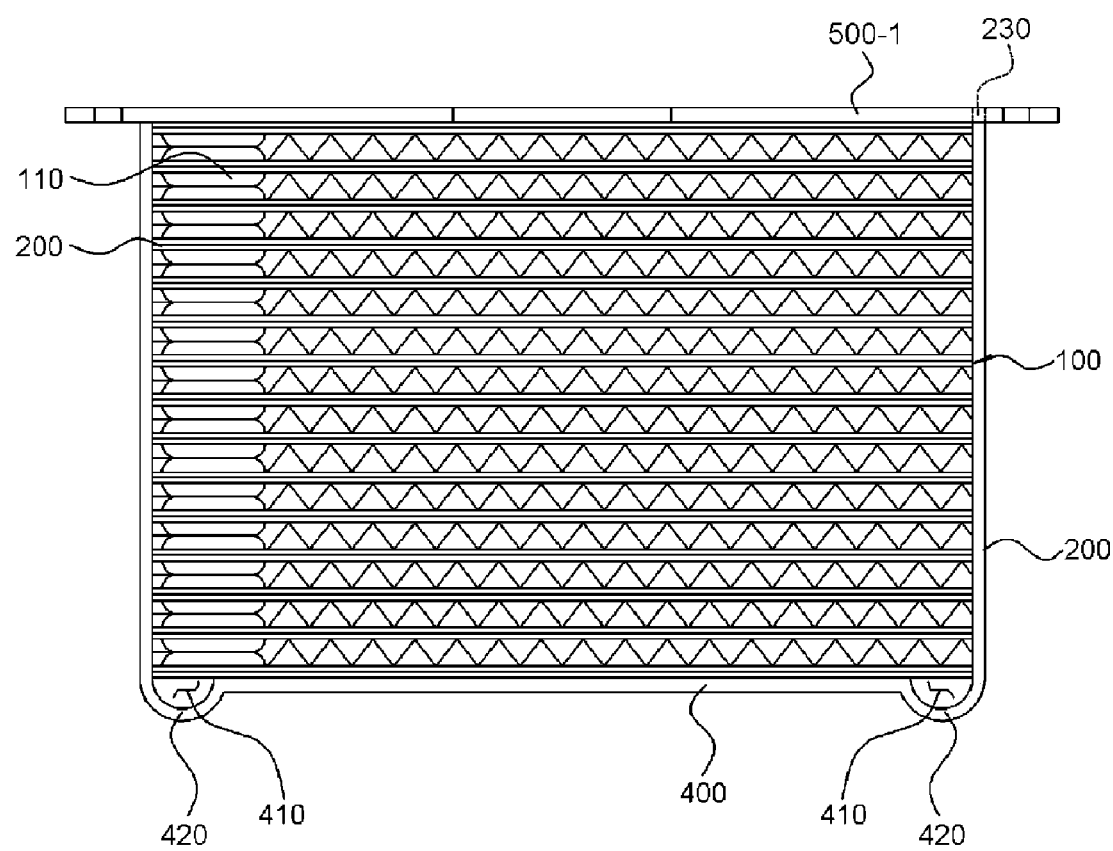
FIG. 6 is a front view illustrating a heat exchanger according to a second exemplary embodiment of the present invention.
Figure 7:
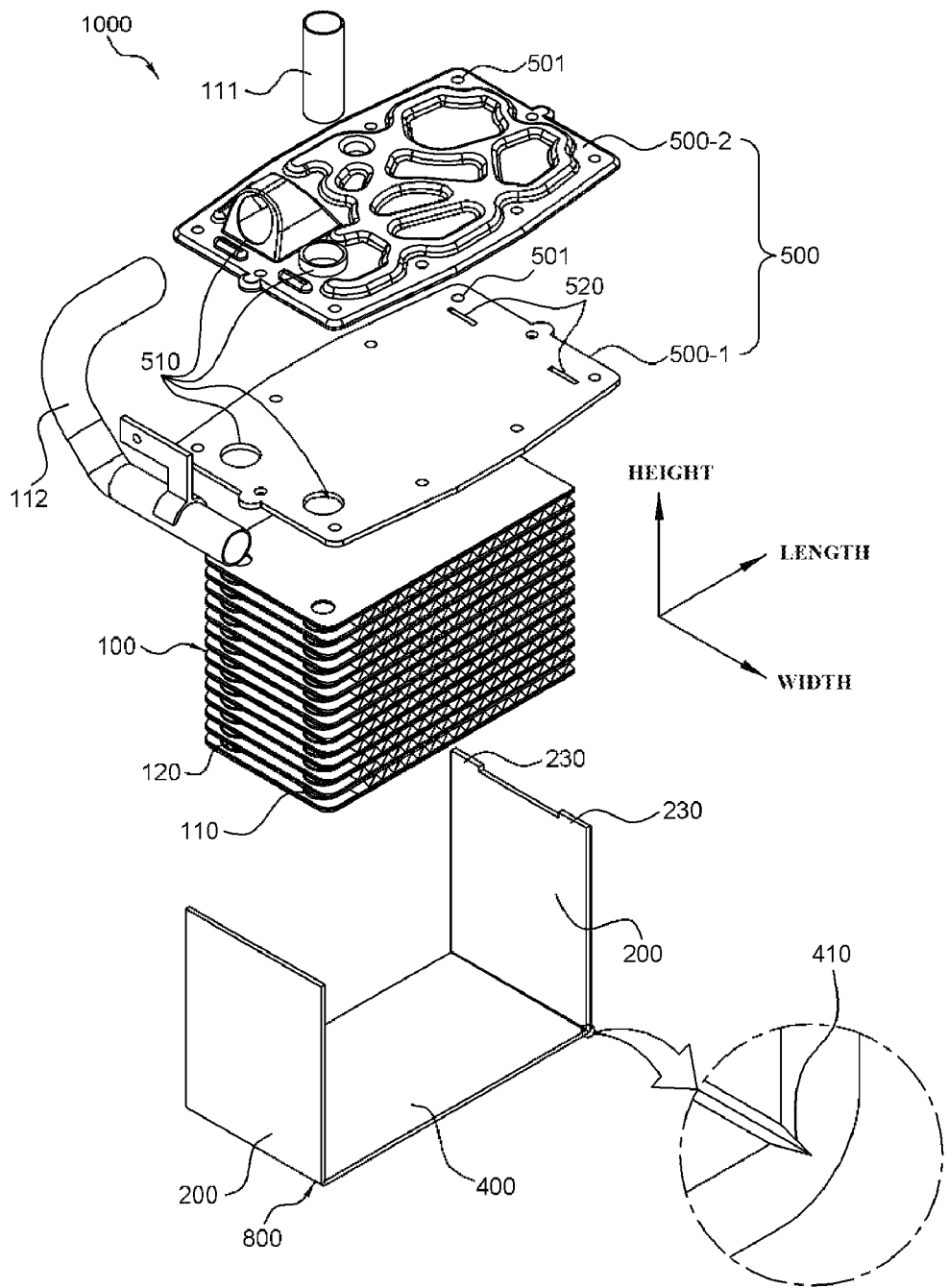
FIG. 7 is a view illustrating an example of an integral reinforcer in the heat exchanger according to the second exemplary embodiment of the present invention.

FIG. 6 is a front view illustrating a heat exchanger according to a second exemplary embodiment of the present invention.

As illustrated, the heat exchanger according to the second exemplary embodiment of the present invention may include: a core part 100 including an inlet header tank 110 and an outlet header tank 120 formed in a height direction with a space for a coolant to be stored or flowing therein, a plurality of tubes 130 having both ends connected to the header tanks 110 and 120 to form a coolant flow path, and fins 140 interposed between the tubes 130; an upper reinforcing plate 500 disposed on the core part 100 in the height direction and having a first fixing/matching section 520 therein; and an integral reinforcer 800 including a pair of lateral reinforcing plates 200 disposed at both sides of the core part 100 in a length direction, an upper side of at least one of the pair of lateral reinforcing plates 200 being coupled to the first fixing/matching section 520 of the upper reinforcing plate 500, and a lower reinforcing plate 400 disposed beneath the core part 100 in the height direction and integrally formed with the pair of lateral reinforcing plates 200, with recesses 410 formed to be concave along a width direction at inner edges where the respective lateral reinforcing plates 200 and the lower reinforcing plate 400 meet.

First, the heat exchanger 1000 according to the second exemplary embodiment of the present invention may largely include the core part 100, the upper reinforcing plate 500, and the integral reinforcer 800 in which the pair of lateral reinforcing plates 200 and the lower reinforcing plate 400 are integrally formed.

As in the first exemplary embodiment described above, the core part 100 may include the inlet header tank 110, the outlet header tank 120, the tubes 130, and the fins 140, and the coolant introduced from the outside may be distributed to the tubes 130 while flowing in the height direction along the inlet header tank 110, flow in the length direction along the tubes 130 and make U-turns to be collected in the outlet header tank 120, and then flow in the height direction to be discharged to the outside. In addition, air may flow from a front side to a rear side in the width direction of the core part 100, and the air may pass between the tubes 130 for heat exchange so that the air is cooled.

The upper reinforcing plate 500 may be formed in a plate shape and disposed in contact with an upper surface of the core part 100, and the upper reinforcing plate 500 may have a coupling hole 510 penetrating through upper and lower surfaces thereof so that the coupling hole 510 is connected to the inlet header tank 110 or the outlet header tank 120. The first fixing/matching section 520 may be formed in the upper reinforcing plate 500.

The integral reinforcer 800 may include the pair of lateral reinforcing plates 200 and the lower reinforcing plate 400, and the pair of lateral reinforcing plates 200 and the lower reinforcing plate 400 may be integrally formed. In this case, the integral reinforcer 800 may be formed in such a manner that the pair of lateral reinforcing plates 200 extend upwardly from both ends of the lower reinforcing plate 400 in the length direction, so that the lateral reinforcing plates 200 of the integral reinforcer 800 are disposed in contact with lateral surfaces of the core part 100 in the length direction and the lower reinforcing plate 400 is disposed in contact with a lower surface of the core part 100. In addition, the upper side of the lateral reinforcing plate 200 may be coupled and fixed into the first fixing/matching section 520 formed in the upper reinforcing plate 500.

As an example, the core part 100, the upper reinforcing plate 500, and the integral reinforcer 800 may form an assembly in which four surfaces of the core part are all surrounded by the reinforcing plates by placing the integral reinforcer 800, inserting and assembling the core part 100 into an internal space of the integral reinforcer 800, and thereafter assembling and coupling the upper reinforcing plate 500 from above.

Here, the integral reinforcer 800 may have recesses 410 concavely formed at inner edges where the lateral reinforcing plates 200 and the lower reinforcing plate 400 meet, and the recesses 410 may be formed continuously along the width direction in a concave manner from one end to the other end in the width direction at the inner edges of the integral reinforcer 800. Accordingly, the inner edges of the integral reinforcer 800 can be formed in a non-round shape. That is, the integral reinforcer 800 may be formed without a protrusion toward an internal space defined by extension lines forming inner wall surfaces of the lateral reinforcing plates 200 and an inner wall surface of the lower reinforcing plate 400 and edges formed by the extension lines.

Therefore, when assembling the core part, the upper reinforcing plate, and the integral reinforcer to form an assembly, an inner edge where the lower reinforcing plate 400 and the lateral reinforcing plate 200 meet may be formed in an angular shape rather than a round shape with the recess 410 formed to be concave, thereby preventing the integral reinforcer 800 from interfering with an edge of the core part 100 when the core part 100 is assembled into the integral reinforcer 800.

In addition, the pair of lateral reinforcing plates 200 and the lower reinforcing plate 400 of the integral reinforcer 800 may be joined to the core part 100 on respective surfaces thereof contacting the core part 100.

That is, as described above, after assembling the core part, the upper reinforcing plate, and the integral reinforcer to form an assembly, the independent components of the assembly may be firmly coupled to each other by joining the surfaces thereof contacting each other through brazing or the like. Accordingly, the reinforcing plates are firmly coupled and joined to surround four surfaces of the core part, so that the core part may be prevented from being deformed even when high-temperature and high-pressure air passes between the tubes, thereby improving durability of the core part.

In addition, the first fixing/matching section 520 of the upper reinforcing plate 500 is a through hole penetrating vertically through the upper reinforcing plate 500, and a first fixing tab 230 extends upwardly from an upper end of the lateral reinforcing plate 200, such that the first fixing tab 230 may be inserted and coupled into the first fixing/matching section 520.

That is, as illustrated, the upper reinforcing plate 500 may have the first fixing/matching section 520 formed as a through hole penetrating through the upper and lower surfaces of the upper reinforcing plate 500, and the lateral reinforcing plate 200 may have the first fixing tab 230 formed to protrude upwardly from the upper end thereof, such that the first fixing tab 230 is inserted and coupled into the first fixing/matching section 520, thereby firmly fixing the lateral reinforcing plate 200 to the upper reinforcing plate 500. Here, an inner edge where the upper reinforcing plate 500 and the lateral reinforcing plate 200 meet may be formed in an angular shape rather than a round shape, thereby preventing interference with an edge of the core part 100 when the core part 100 is assembled. Each of the first fixing/matching section 520 and the first fixing tab 230 may be formed in a plural number.

In addition, the integral reinforcer 800 may be formed by bending a single plate, with U-shaped curved sections 420 formed to be convex downwardly at folded portions on both ends of the lower reinforcing plate 400 in the length direction such that concave inner sides of the curved sections 420 are formed as the recesses 410, and the lateral reinforcing plates 200 may extend upwardly from ends of the curved sections 420.

That is, as illustrated, the integral reinforcer 800 may be formed by bending a single flat plate, such that the pair of lateral reinforcing plates 200 and the lower reinforcing plate 400 are integrally formed. In a bent state, both upright sides may be the lateral reinforcing plates 200 and a horizontal portion may be the lower reinforcing plate 400. Here, the U-shaped curved section 420 may be formed to be convex downwardly at a position adjacent to a portion to be bent of the single flat plate, and the curved section 420 may be formed by pressing the plate in such a manner as to be convex downwardly while an upper surface thereof has the concave recess 410. Further, the integral reinforcer 800 may be formed by bending the plate in a state where the curved section 420 is formed by pressing the plate. In this case, the curved section 420 makes it easy to bent the plate, and the integral reinforcer 800 may be formed without a protrusion toward an internal space defined by extension lines forming inner wall surfaces of the lateral reinforcing plates 200 and an inner wall surface of the lower reinforcing plate 400 and edges formed by the extension lines when the plate is bent.

In addition, the integral reinforcer 800 may be formed by bending a single plate, while the recesses 410 are formed to be concave at folded portions in the form of V-shaped notches at inner edges where the lateral reinforcing plates 200 and the lower reinforcing plate 400 meet.

Figure 8:
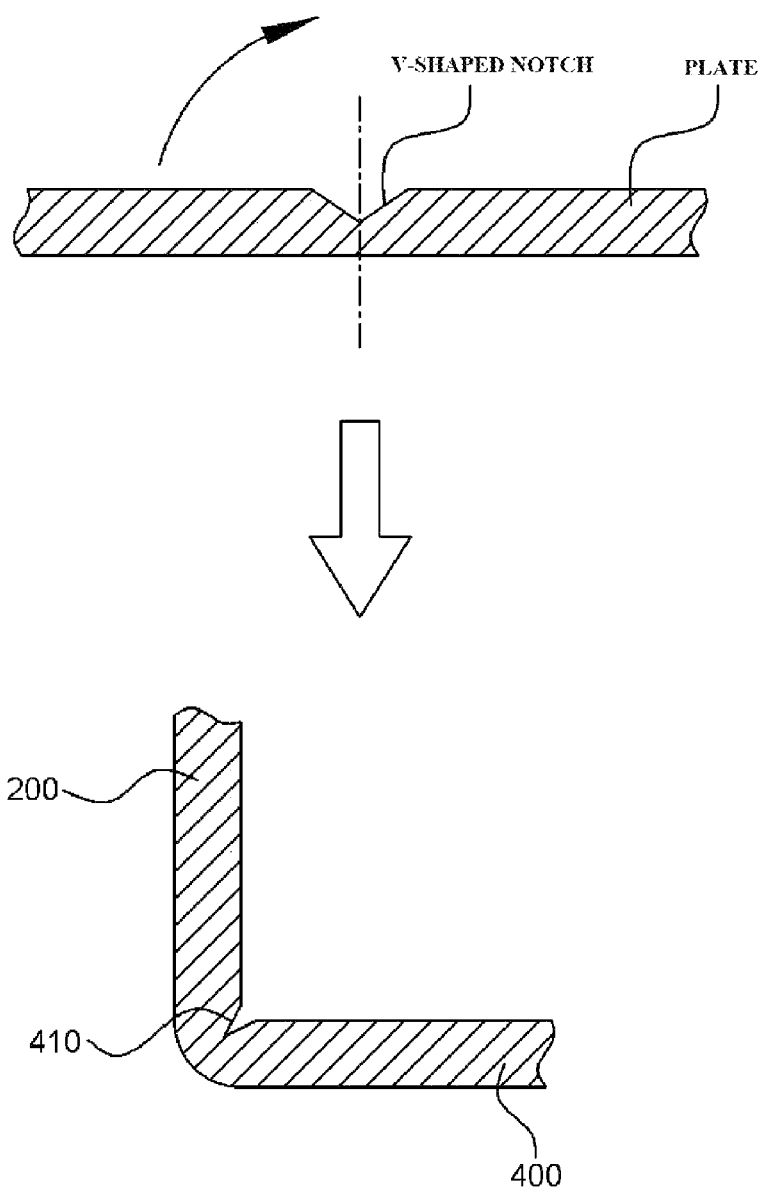
FIG. 8 is a view illustrating an example of an integral reinforcer in the heat exchanger according to the second exemplary embodiment of the present invention.

That is, as in FIG. 8, the integral reinforcer 800 may be formed by bending a single flat plate, such that the pair of lateral reinforcing plates 200 and the lower reinforcing plate 400 are integrally formed. In a bent state, both upright sides may be the lateral reinforcing plates 200 and a horizontal portion may be the lower reinforcing plate 400. Here, the V-shaped notch may be concavely formed on an upper surface of the single flat plate at a portion to be bent, and the notch may be concavely formed on the upper surface of the plate by pressing the plate while a lower surface of the plate remains as a flat surface. In this state, the integral reinforcer 800 may be formed by bending the plate on the basis of a portion where the notch is formed. Accordingly, the plate can be easily bent when manufacturing the integral reinforcer 800 by bending the plate, and the integral reinforcer 800 may be formed without a protrusion toward an internal space defined by extension lines forming inner wall surfaces of the lateral reinforcing plates 200 and an inner wall surface of the lower reinforcing plate 400 and edges formed by the extension lines when the plate is bent.

In addition, the lateral reinforcing plates 200 and the lower reinforcing plate 400 of the integral reinforcer 800 may have slot-type holes 440 connected to the recesses 410 in the form of notches and penetrating through both sides thereof.

Figure 9:
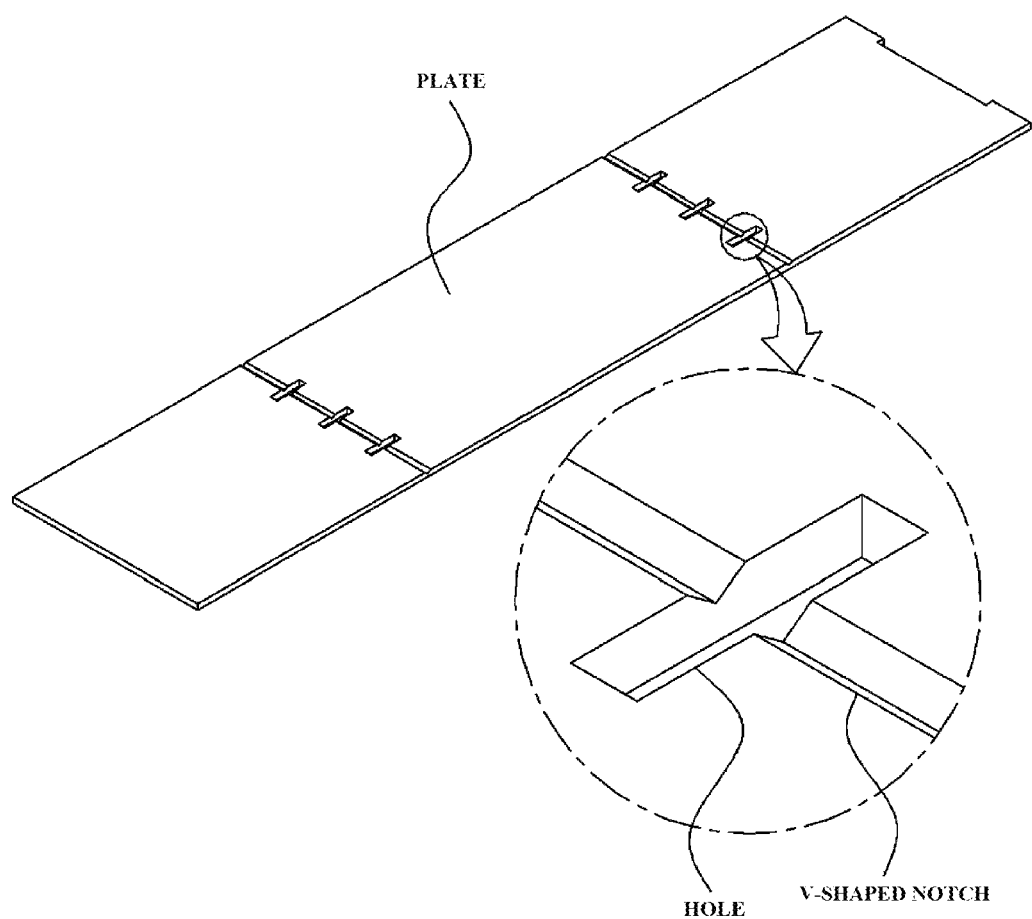
FIG. 9 is a view illustrating an example of an integral reinforcer in the heat exchanger according to the second exemplary embodiment of the present invention.
Figure 10:
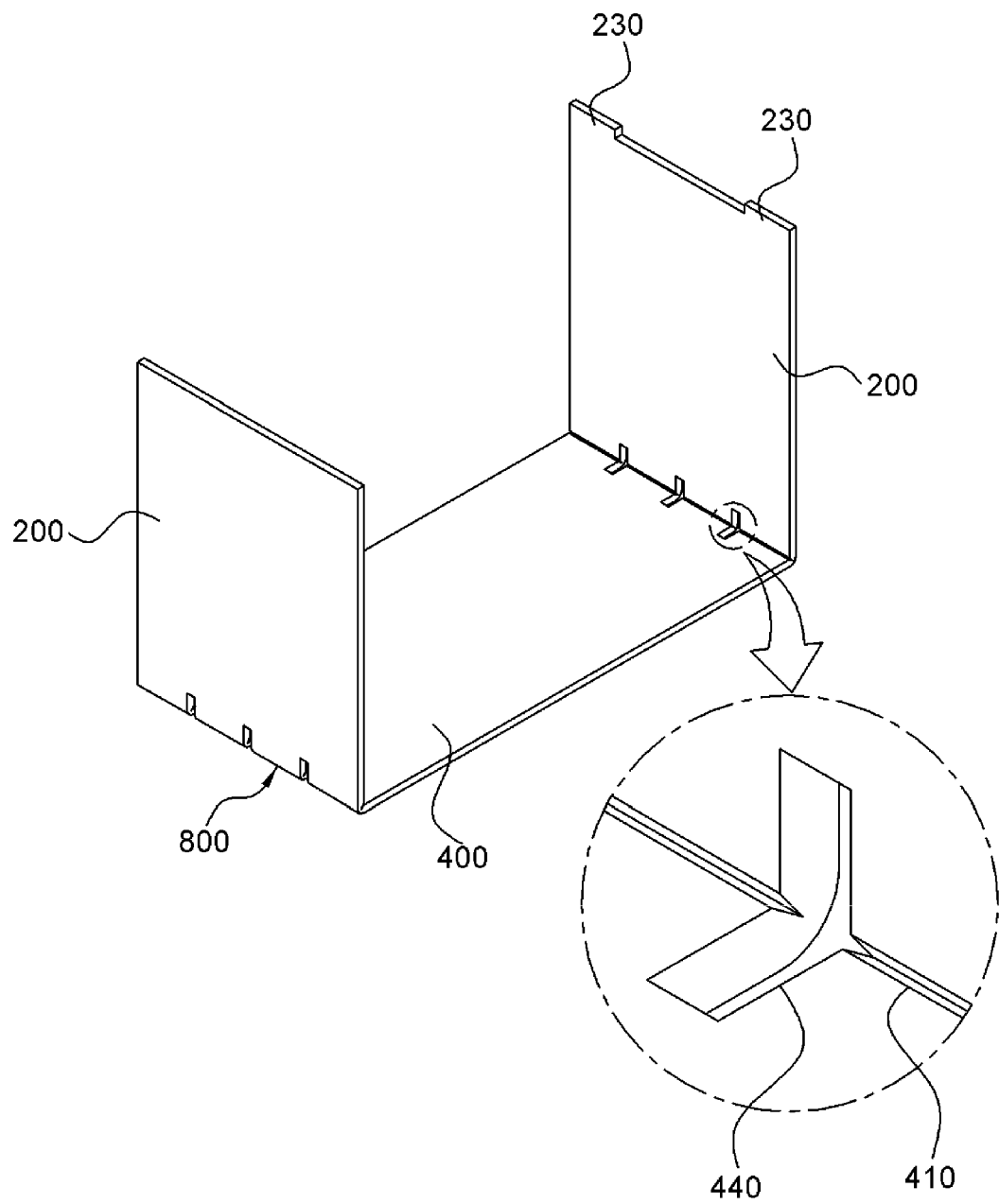
FIG. 10 is a view illustrating an example of an integral reinforcer in the heat exchanger according to the second exemplary embodiment of the present invention.
Figure 11:
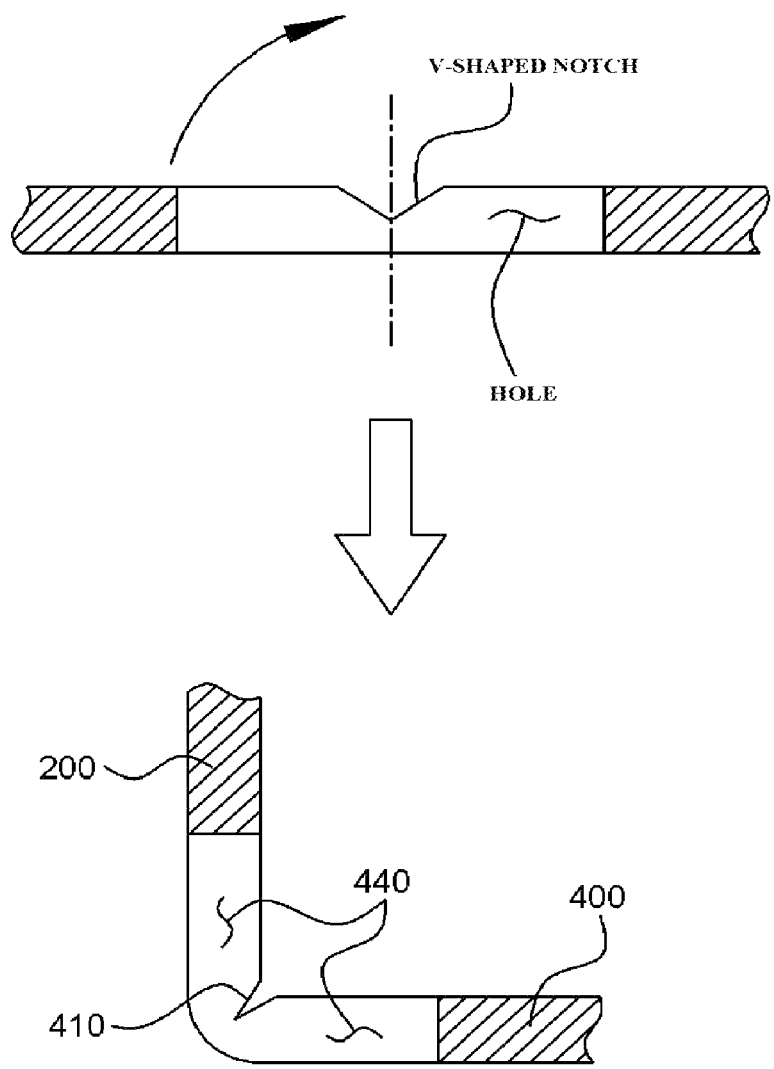
FIG. 11 is a view illustrating an example of an integral reinforcer in the heat exchanger according to the second exemplary embodiment of the present invention.

That is, as in FIGS. 9 to 11, the V-shaped notch may be concavely formed on the upper surface of the single flat plate at the portion to be bent, and the slot-type hole may be formed to penetrate vertically through the single flat plate while being in contact with the V-shaped notch in a portion where the V-shaped notch is formed. In this case, the hole may be formed to be long along a direction perpendicular to the direction in which the V-shaped notch is formed, and a plurality of holes may be formed to be spaced apart from each other along the direction in which the V-shaped notch is formed. Accordingly, the plate can be easily bent on the basis of the portion where the notch is formed when forming the integral reinforcer 800 by bending the plate, and the integral reinforcer 800 may be formed without a protrusion toward an internal space defined by extension lines forming inner wall surfaces of the lateral reinforcing plates 200 and an inner wall surface of the lower reinforcing plate 400 and edges formed by the extension lines at the bent portions.

In addition, the heat exchangers 1000 according to the first exemplary embodiment and the second exemplary embodiment of the present invention may further include a blocking plate 300 extending from the lateral reinforcing plate 200 in the length direction, and the blocking plate 300 may be formed to partially cover a lateral surface of the core part 100 in the length direction. The blocking plate 300 may also be joined to the core part 100 by brazing.

Figure 12:
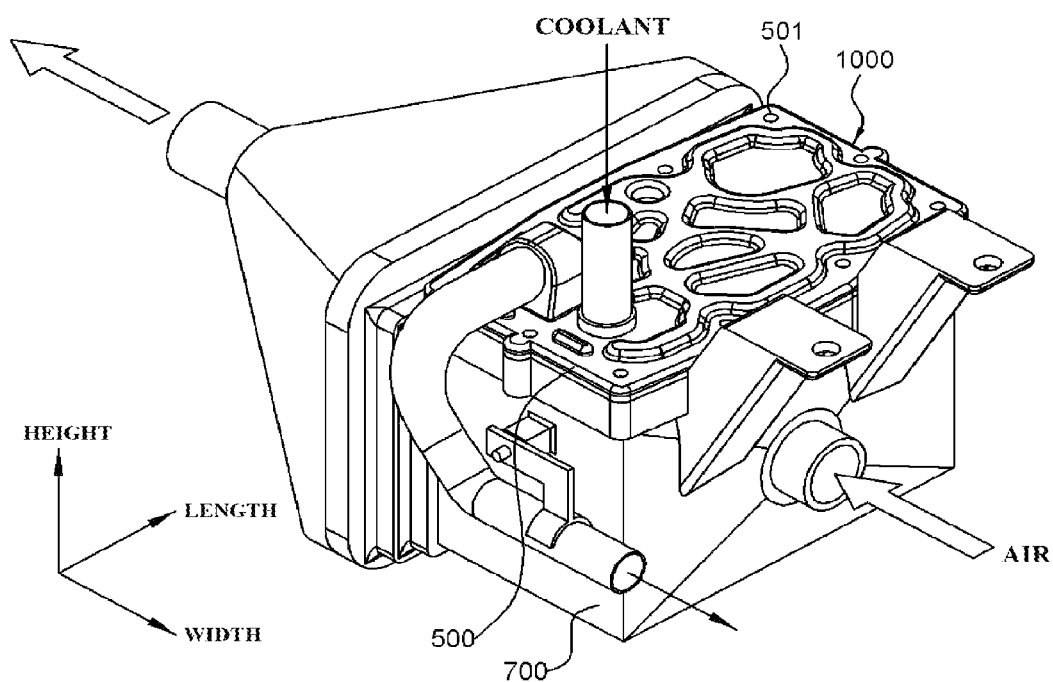
FIG. 12 is a perspective view illustrating a state in which the heat exchanger according to the first exemplary embodiment or the second exemplary embodiment of the present invention is inserted and assembled into a housing.
Figure 13:
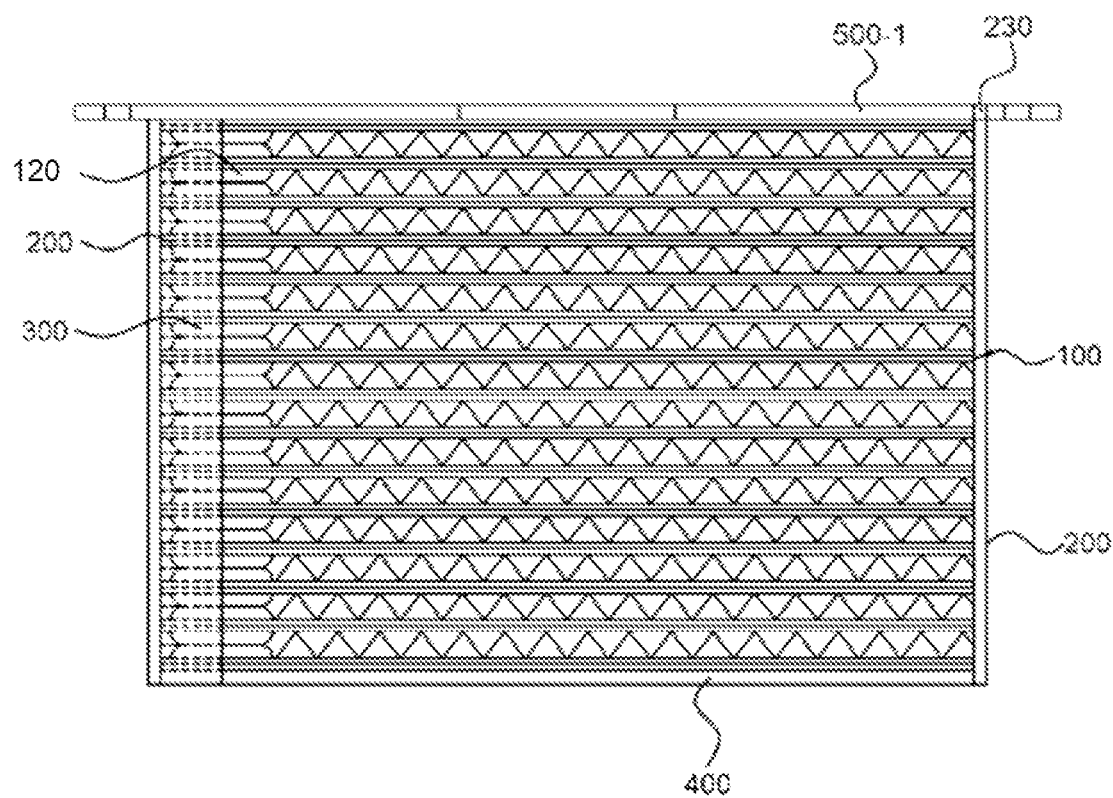
FIG. 13 is a view illustrating an example of an embodiment of the invention.

In addition, as in FIG. 12, the upper reinforcing plate 500 may be formed to be wider than the upper surface of the core part 100, and fastening holes 501 penetrating vertically through the upper reinforcing plate 500 may be formed along the perimeter of the upper reinforcing plate 500, such that after the core part 100 is inserted and assembled into a housing 700 that is formed to allow air to pass therethrough, the upper reinforcing plate 500 is coupled to the housing 700 using a fastening means.

In addition, the upper reinforcing plate 500 may include a first upper reinforcing plate 500-1 and a second upper reinforcing plate 500-2. The first upper reinforcing plate 500-1 is disposed in contact with the upper surface of the core part 100, and the second upper reinforcing plate 500-2 is disposed on an upper surface of the first upper reinforcing plate 500-1, such that the core part 100, the first upper reinforcing plate 500-1, and the second upper reinforcing plate 500-2 may be joined to each other by brazing. Furthermore, the coupling holes 510 are formed in the upper reinforcing plate 500, so that each of the coupling holes 510 may be connected to any one of the inlet header tank 110, the outlet header tank 120, an inlet pipe 111, and an outlet pipe 121.

In addition, a rib may be formed to be convex upwardly from an upper surface of the second upper reinforcing plate 500-2 in the form of a flat plate, and a space portion may be formed to be concave from a lower surface of the second upper reinforcing plate 500-2 opposite to the side on which the rib is formed to correspond to the protruding shape of the rib. Accordingly, the lower surface of the second upper reinforcing plate 500-2, except an area where the space portion is formed, may be in contact with the upper surface of the first upper reinforcing plate 500-1 and joined thereto by brazing or the like, so that a joined section is formed, and the first upper reinforcing plate 500-1 and the second upper reinforcing plate 500-2 may be joined to each other to be integrally formed. Furthermore, the upper reinforcing plate 500 may have the fastening holes 501 formed therein to be coupled to the housing 700 by the fastening means such as bolts.

In addition, the heat exchanger 1000 according to the second exemplary embodiment of the present invention may further include a blocking plate extending from the lateral reinforcing plate 200 in the length direction as in the first exemplary embodiment, and the blocking plate may be formed to partially cover a lateral surface of the core part 100 in the length direction. The blocking plate may also be joined to the core part 100 by brazing.

The present invention is not limited to the above-described exemplary embodiments, and may be applied in a wide range. The present invention may be variously modified by any person having ordinary knowledge in the field to which the present invention pertains without departing from the gist of the present invention claimed in the claims.

DESCRIPTION OF REFERENCE NUMERALS

1000: heat exchanger
100: core part
110: inlet header tank
111: inlet pipe
120: outlet header tank
121: outlet pipe
130: tube
140: fin
200: lateral reinforcing plate
220: second fixing/matching section
230: first fixing tab
300: blocking plate
400: lower reinforcing plate
410: recess
420: curved section
430: second fixing tab
440: slot-type hole
500: upper reinforcing plate
500-1: first upper reinforcing plate
500-2: second upper reinforcing plate
501: fastening hole
510: coupling hole
520: first fixing/matching section
700: housing
800: integral reinforcer

The invention claimed is:
1. A heat exchanger comprising:
a core part including an inlet header tank, an outlet header tank, a plurality of tubes and fins;
an upper reinforcing plate disposed on the core part in the height direction and having a first fixing/matching section therein;
a pair of lateral reinforcing plates disposed at both sides of the core part in a length direction and having second fixing/matching sections formed in respective lower sides thereof, an upper side of at least one of the pair of lateral reinforcing plates being coupled to the first fixing/matching section of the upper reinforcing plate
a lower reinforcing plate disposed beneath the core part in the height direction and having both sides coupled to the second fixing/matching sections of the pair of lateral reinforcing plates; and
wherein the first fixing/matching section of the upper reinforcing plate is a through hole penetrating vertically through the upper reinforcing plate, and a first fixing tab extends upwardly from an upper end of the lateral reinforcing plate, such that the first fixing tab is inserted and coupled into the first fixing/matching section, and the second fixing/matching sections of the pair of lateral reinforcing plates are cut grooves formed to be concave upwardly from respective lower ends of the pair of lateral reinforcing plates, and the lower reinforcing plate has second fixing tabs extending outwardly from both ends thereof in the length direction respectively, such that the second fixing tabs are inserted and coupled into the second fixing/matching sections,
the heat exchanger, further comprising;

a blocking plate formed to partially cover a lateral surface of the core part in the length direction, wherein the blocking plate extends from the lateral reinforcing plate in the length direction and the lateral reinforcing plate and the blocking plate are integrally formed in a bending shape, and the lower reinforcing plate is inserted and disposed inside between the pair of lateral reinforcing plates and the blocking plate, so that a lateral surface in the length direction and a lateral surface in the width direction of the lower reinforcing plate are contacted and joined to the lateral reinforcing plates and the blocking plate.

2. The heat exchanger of claim 1, wherein the core part, the upper reinforcing plate, the pair of lateral reinforcing plates, and the lower reinforcing plate are each independently formed, and respective surfaces thereof contacting each other are joined.

3. The heat exchanger of claim 1, wherein each of the first fixing/matching section and the first fixing tab is formed in a plural number.

\* \* \* \* \*